United States Patent [19]

Daniels

[11] Patent Number: 4,946,332
[45] Date of Patent: Aug. 7, 1990

[54] CONVERTIBLE BOAT & VEHICLE TRAILER

[76] Inventor: Lewis D. Daniels, E. 14 16th Ave., Spokane, Wash. 99203

[21] Appl. No.: 247,050

[22] Filed: Sep. 20, 1988

[51] Int. Cl.$^5$ .............................. B60P 1/04; B60P 3/08
[52] U.S. Cl. ...................................... 414/477; 280/401;
280/414.1; 410/2; 410/24; 414/483; 414/494; 414/533
[58] Field of Search ............... 414/469, 477, 478, 482, 414/483, 484, 491, 494, 529, 532, 533, 537, 538; 280/414.1, 401; 296/157, 182; 410/2, 3, 4, 24, 26, 29, 29.1

[56] References Cited

U.S. PATENT DOCUMENTS

| | | | |
|---|---|---|---|
| 2,808,953 | 10/1957 | Whitney | 414/532 X |
| 2,977,011 | 3/1961 | Okerlund . | |
| 3,159,294 | 12/1964 | Forsythe, Jr. . | |
| 3,292,802 | 12/1966 | Hutchinson . | |
| 3,380,607 | 4/1968 | Dale | 414/482 X |
| 3,649,064 | 3/1972 | Bledsoe . | |
| 3,677,425 | 7/1972 | Patten . | |
| 3,708,081 | 1/1973 | Schladenhauffen | 414/538 X |
| 3,718,227 | 2/1973 | Swift | 414/495 |
| 4,015,879 | 4/1977 | Shonkwiler | 414/477 X |
| 4,068,772 | 1/1978 | Prudhomme . | |
| 4,221,420 | 9/1980 | Vencill et al. | 280/414.1 X |
| 4,278,375 | 7/1981 | Drake et al. . | |
| 4,368,002 | 1/1983 | Krzyzosiak, Jr. | 410/26 X |
| 4,406,477 | 9/1983 | McDonald | 410/24 X |
| 4,456,420 | 6/1984 | Newhard . | |
| 4,469,346 | 9/1984 | Low | 410/26 X |
| 4,560,316 | 12/1985 | Daniels | 280/414.1 X |
| 4,568,235 | 2/1986 | Bills, Jr. | 414/482 X |
| 4,589,814 | 5/1986 | Cates . | |
| 4,702,662 | 10/1987 | Marlett . | |
| 4,705,289 | 11/1987 | Weber . | |
| 4,749,317 | 6/1988 | Daniel | 414/538 X |
| 4,784,545 | 11/1988 | Lawrence | 414/482 X |
| 4,880,250 | 11/1989 | Cravens et al. | 414/481 X |

FOREIGN PATENT DOCUMENTS

| | | | |
|---|---|---|---|
| 2818293 | 11/1978 | Fed. Rep. of Germany | 414/491 |
| 1230886 | 5/1986 | U.S.S.R. | 414/494 |

Primary Examiner—Robert J. Spar
Assistant Examiner—Robert S. Katz
Attorney, Agent, or Firm—Wells, St. John & Roberts

[57] ABSTRACT

A trailer capable of carrying a boat and vehicle in a dual load mode of operation wherein the boat is mounted rearwardly of the vehicle in an inclined position with the bow of the boat above portions of the vehicle being carried. The trailer is also convertible into a single load mode of operation wherein the boat is carried low in a conventional orientation by lowering a supporting boat carriage into a collapsed position near the frame of the trailer. The trailer is provided with a boat carriage which is connected to the frame of the trailer and supported by a lifting mechanism which causes the boat carriage and any supported boat to shift rearwardly when they are moved from the collapsed position into the extended raised position. This rearward movement automatically shifts the weight of the boat carriage and any supported boat rearwardly to counteract the loading associated with a vehicle on forward portions of the trailer. When used with boats and vehicles of normal sizes and weights the trailer automatically maintains the center of gravity of the trailer within an acceptable range whether used in the single load or dual load modes of operation, and without adjustment.

6 Claims, 5 Drawing Sheets

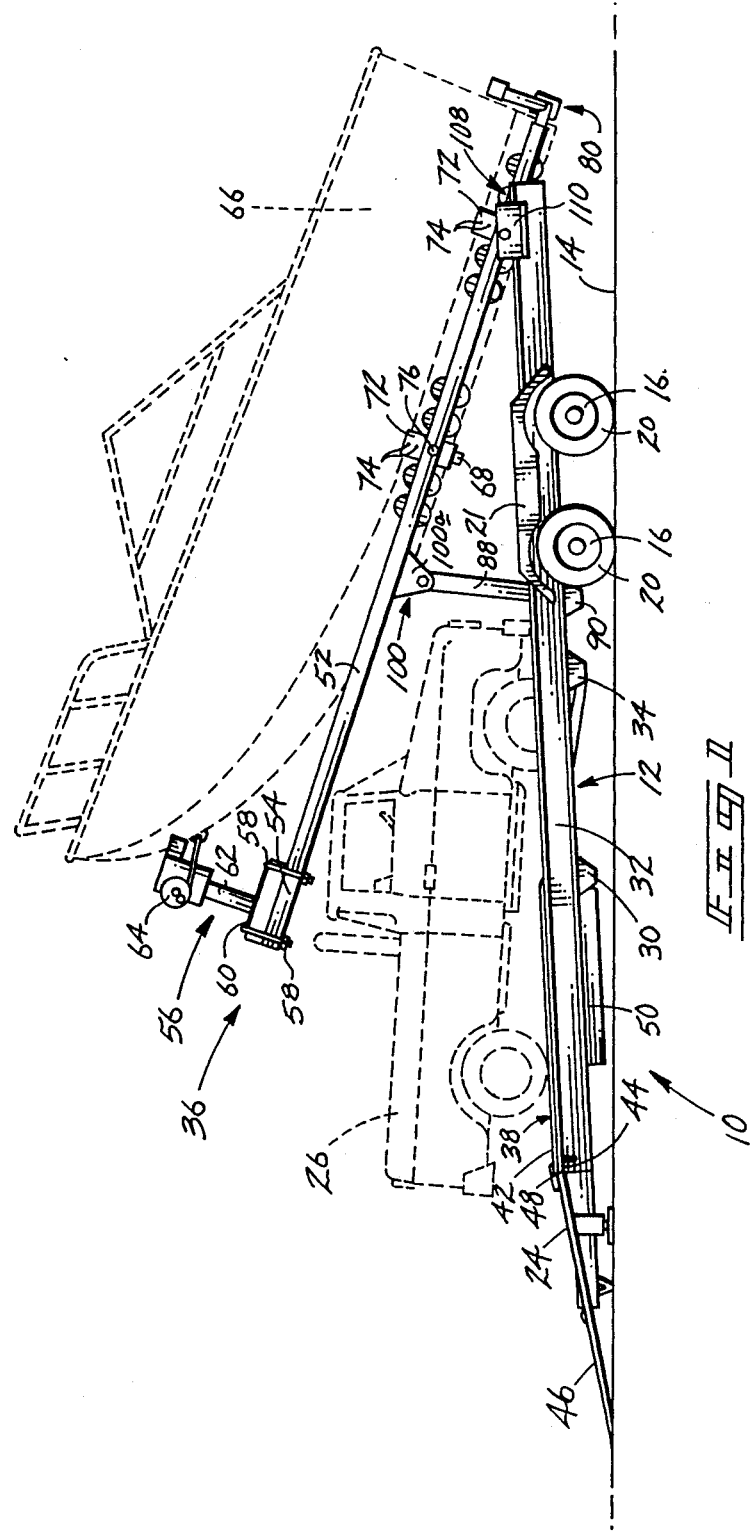

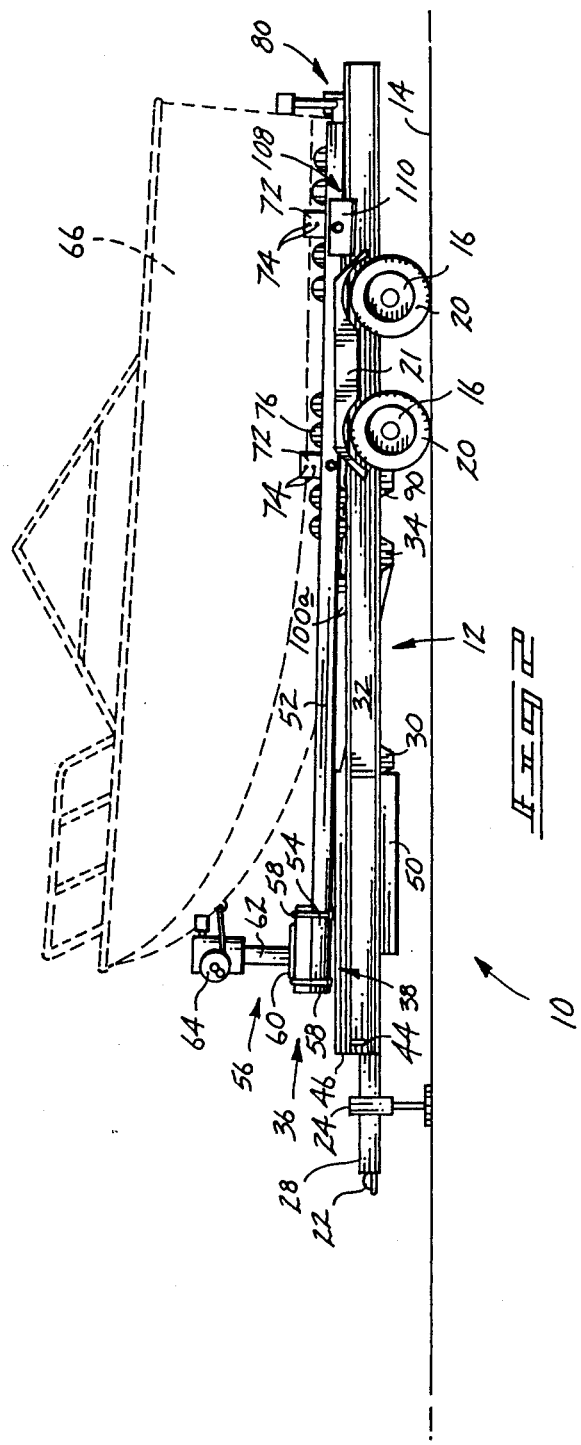

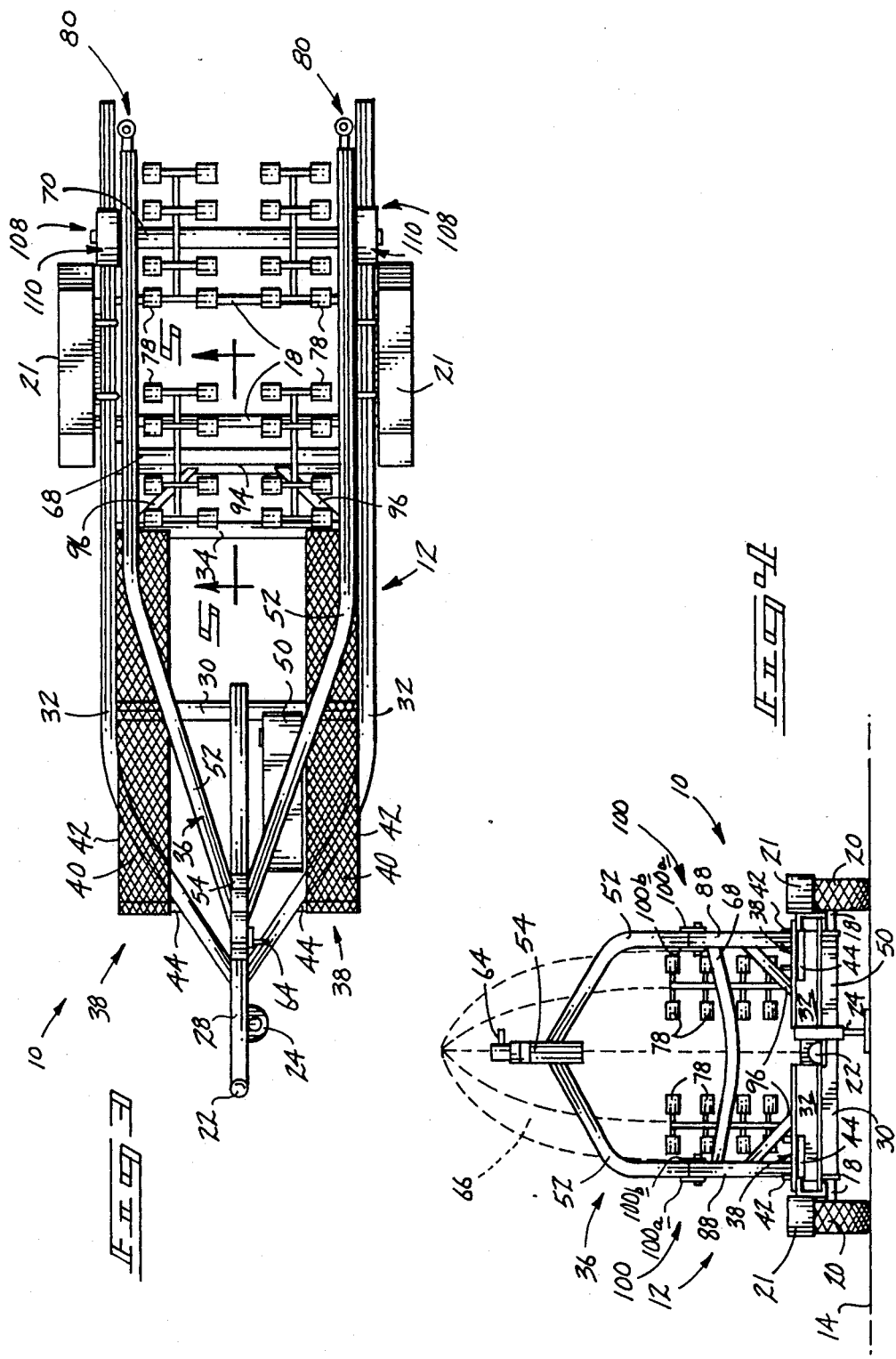

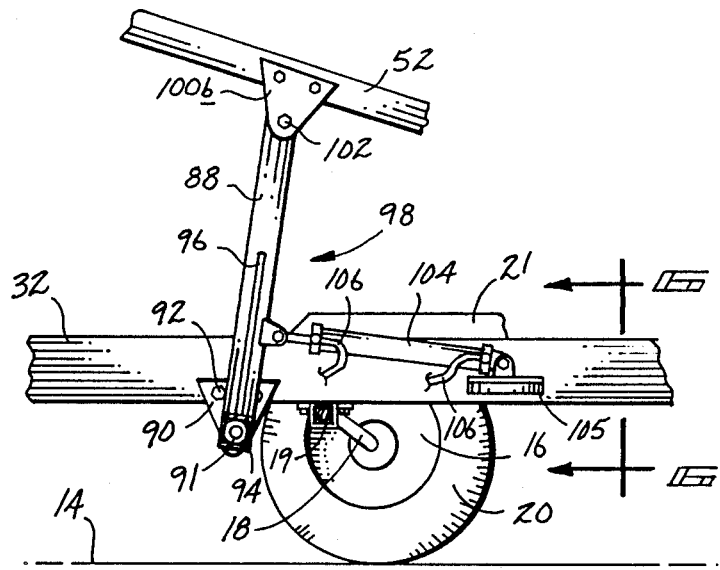
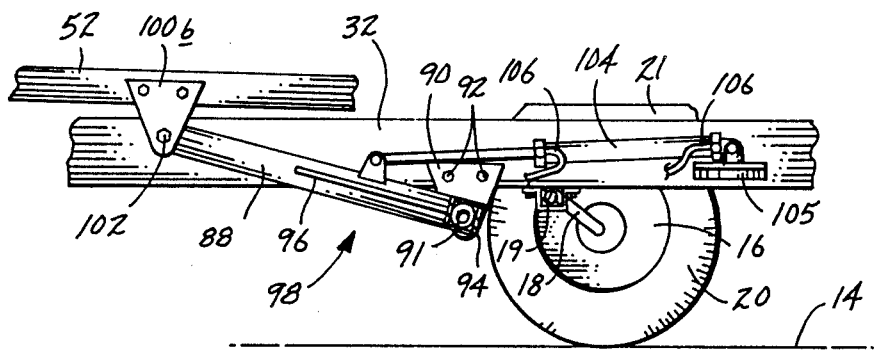
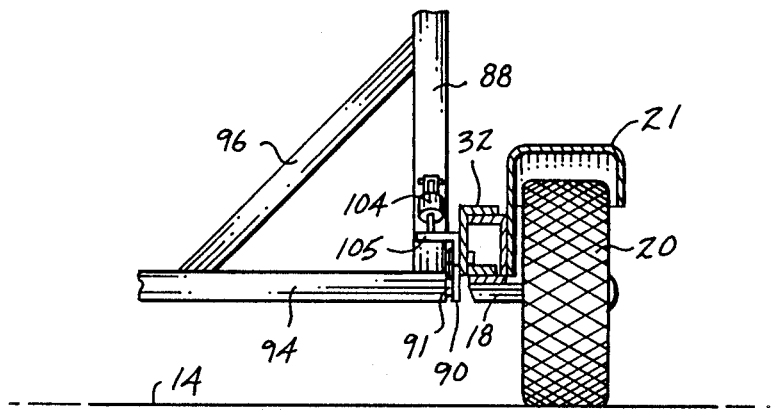

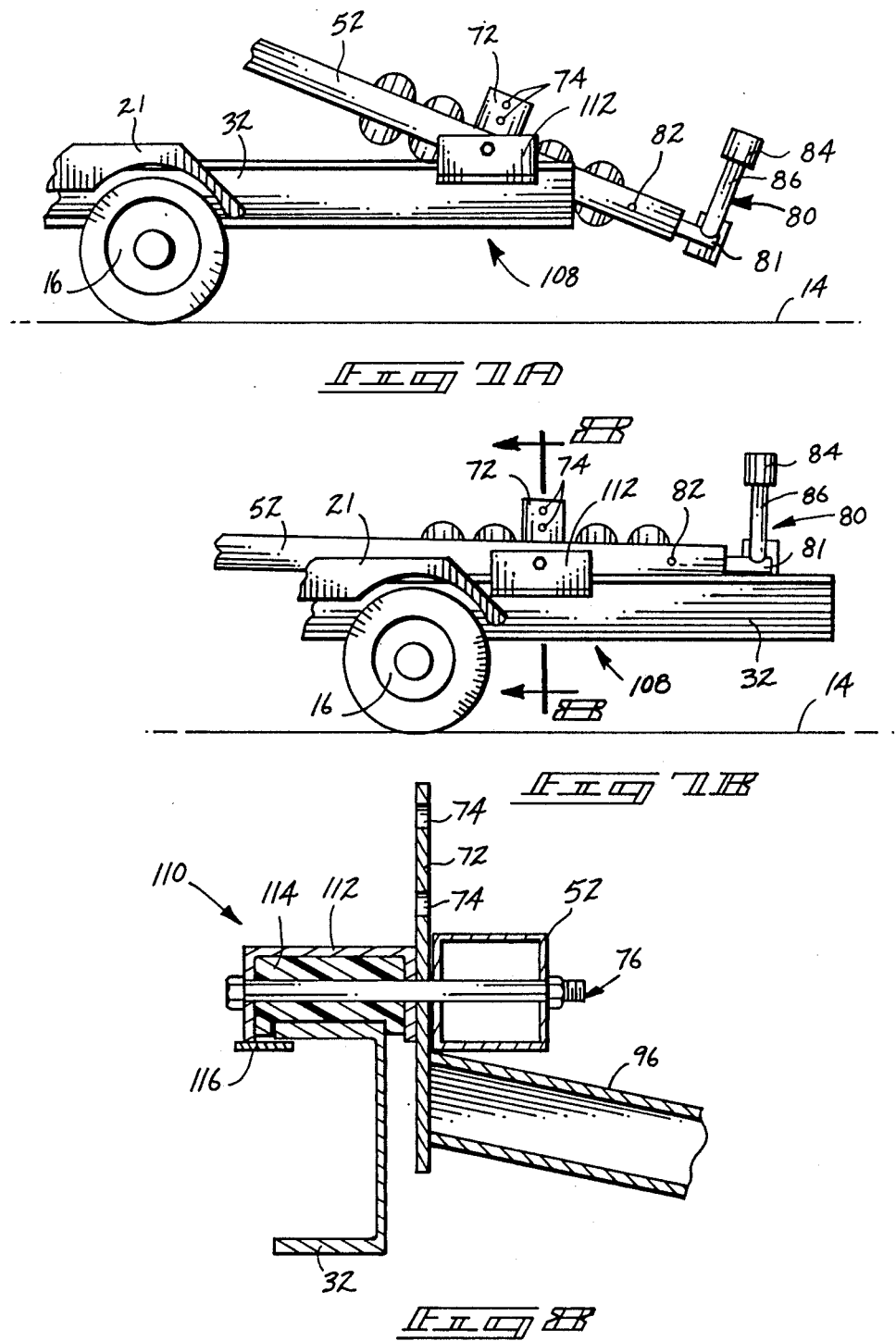

CONVERTIBLE BOAT & VEHICLE TRAILER

TECHNICAL FIELD This invention relates to trailers for carrying boats and motor vehicles. More specifically, it relates to such trailers having the ability to convert between dual loaded and single loaded conditions.

BACKGROUND OF THE INVENTION

The increased popularity of motor homes has led to a desire to travel with both a boat for water travel and a smaller car or other wheeled vehicle for more convenient and economical travel around towns or on side trips. Many travelers have been forced to drive both a motor home and auxiliary vehicle under their own power and to pull the boat on a trailer behind the motor home or auxiliary vehicle. Although this approach has the increased reliability of two vehicles it creates a caravan out of a travel trip and requires either increased communications equipment or greater patience to compensate for the missed turns and other coordination problems which result from two vehicles traveling together.

Previous attempts have been made at creating trailer assemblies which are capable of carrying both a boat and auxiliary vehicle in order to overcome the problems indicated above. Many of these attempts have focused on trailer designs which place a boat on a frame or secondary trailer which is mounted above the auxiliary vehicle. Some of these devices use an elevator structure which is lowered to allow installation of the boat. This approach has required that the auxiliary vehicle be removed from the trailer prior to either installation or launching or other removal of the boat. The requirement that the vehicle be removed prior to installation or removal of the boat necessarily entails extra work, time and inconvenience.

Prior art trailer structures which utilize secondary boat trailers necessarily are more costly because of the extra tires, wheels, bearings, springs and related equipment which is duplicated. Such devices are also typically cumbersome and heavy to haul These devices also require the secondary boat trailer to be removed from the primary trailer before the boat can be launched rather than allowing the boat to be directly launched from the primary trailer.

In order to solve at least some of these limitations of the prior art, the current inventor created the boat and motor vehicle trailer described in U.S. Pat. No. 4,560,316. This trailer represented a substantial step in the art of dual load boat and vehicle trailers. Unfortunately, it had certain disadvantages associated with requirements that the frame structure be adjusted relative to the trailer wheel carriage in order to adjust the center of gravity and balance of the trailer when changing from single load conditions with just a boat, compared to dual load conditions with both a boat and vehicle. It also presented substantial amounts of surface area under the boat to create wind resistance, particularly during single load conditions with just a boat.

The current invention provides a novel dual load boat and vehicle trailer which is capable of launching a boat whether the vehicle has been removed or is still riding on the trailer. It also is convertible between single load and dual load modes of operation so as to allow a boat carried alone to be positioned low on the trailer. It is also advantageously constructed to automatically redistribute the weight of the boat and its supporting boat carriage when changed between single and dual load conditions. These and other benefits and advantages of the invention will be described or apparent from the detailed description given herein.

BRIEF DESCRIPTION OF THE DRAWINGS

A preferred embodiment of the invention is illustrated in the accompanying drawings which are briefly described below.

FIG. 1 is a side elevational view showing a preferred trailer with a boat and wheeled vehicle shown in phantom riding thereon in a dual load mode of operation.

FIG. 2 is a side elevational view showing the novel trailer of FIG. 1 converted for a single load mode of operation.

FIG. 3 is a top view of the trailer as shown in FIG. 2.

FIG. 4 is a front elevational view of the trailer as shown in Fig 1.

FIGS. 5A and 5B are enlarged partial elevational and sectional views looking from the inside of the trailer along section line 5—5 as shown in FIG. 3. FIGS. 5A and 5B show a swing arm linkage arrangement used to controllably elevate and retract the boat supporting carriage.

FIG. 6 is an enlarged partial elevational and sectional view taken along section line 6—6 of FIG. 5A.

FIG. 7A is an enlarged partial side elevational view showing rear portions of the trailer as shown in FIG. 2.

FIG. 7B is an enlarged partial side elevational view showing rear portions of the trailer as shown in FIG. 1. FIG. 7B is similar to FIG. 7A except the boat carriage has been contracted into the single load position.

FIG. 8 is an enlarged sectional view taken along section line 8—8 of FIG. 7B.

DETAILED DESCRIPTION OF THE PREFERRED EMBODIMENT

The following disclosure of the invention is submitted in compliance with the constitutional purpose of the Patent Laws "to promote the progress of science and useful arts"(Article 1, Section 8).

FIG. 1 shows a preferred form of trailer 10 which embodies the inventive concepts of this invention. Trailer 10 includes a frame 12 which is supported upon a road surface 14 using wheels 16. Wheels 16 are rotatably mounted on axle assemblies 18 (see FIG. 3). Trailer 10 preferably includes a plurality of axle assemblies to provide increased fore and aft stability to the trailer and to reduce the tongue weight. Axle assemblies 18 are preferably integrated axle and torque tube suspension assemblies commercially available and well-knOwn in the art. The axle assemblies are preferably mounted to frame 12 using detachable mounting brackets 19 which are bolted to the frame Alternatively, the wheels can be mounted to frame 12 using many other alternative wheel and axle mounting and suspension systems known or hereafter developed in the art. Wheels 16 mount tires 20 which are in rolling contact with road surface 14 in the typical fashion. The wheels and tires are preferably covered by wheel fenders 21 as is common.

Frame 12 is preferably provided with a suitable hitch 22 integrally mounted to the forward point of the frame or at some other suitable forward location. A tongue support jack 24 is preferably provided for supporting the tongue of the trailer, such as during connection or disconnection of the hitch to and from a towing vehicle.

FIG. 3 shows the general layout of frame 12. The frame includes a tongue member 28 which extends from the hitch 22 rearwardly and is welded or otherwise securely connected to a forward transverse frame member 30. The forward transverse frame member is securely connected at its ends to longitudinal frame members 32. Longitudinal frame members 32 are connected to the tongue member 28 at points forward to the connection of the tongue member with forward or first transverse frame member 30 in order to provide lateral support to the tongue member. The longitudinal frame members are advantageously formed from continuous pieces of material from their connection with tongue member 28 to their distal rear ends. As shown, the longitudinal frame members are formed from C-shaped members, although other structural shapes will also be possible.

The longitudinal frame members 32 are also joined by a second transverse frame member 34. The transverse frame members 30 and 34 laterally space and support the longitudinal members 32 and serve to maintain such members in a substantially parallel relationship from just ahead of the forward transverse member to the distal rear ends of the longitudinal members. Lateral support and spacing between the longitudinal members is also aided by the axle assemblies and the boat carriage 36 which will be described more fully hereinafter.

FIG. 3 also shows a pair of vehicle support platforms 38 or similar means for supporting the wheeled vehicle 26 or other vehicles thereon above the roadway surface. The vehicle support platforms can be of various forms and types, although the preferred form as shown has certain advantages. As shown, the platforms are provided with reticulated or mesh upper surface panels 40. The platform upper surface panels advantageously have perimeter frames 42 which extend about the panels to structurally support them upon the longitudinal members 32 and transverse members 30 and 34. The rearward ends of vehicle supports 38 are preferably curved downwardly and mounted to second transverse member 34 in a manner which lowers the upper surfaces of the vehicle supports to a minimum elevation to provide maximum clearance between the vehicle supports and the lower surfaces of the boat carriage 36. The forward ends of the vehicle supports are advantageously constructed to extend beyond the converging portions of the longitudinal members and are supported using cantilever support pieces 44 which are securely mounted to the longitudinal frame members.

The trailer is also advantageously provided with detachable vehicle loading ramps or gangways 46. Gangways 46 are preferably adapted to hang on the forward ends of the vehicle platforms using gangway brackets 48. The gangways are preferably stowed on the trailer just inwardly from the vehicle platforms 38.

Frame 12 is also advantageously adapted to carry an equipment storage container 50 which is mounted to the transverse member 30 and longitudinal member 32. Container 50 mounts and protects a high capacity battery, electric motor powered by the battery, control switch for the electric motor, hydraulic pump and related equipment (not shown) for supplying pressured hydraulic oil or other fluid to power the raising and lowering of the boat carriage 36. Other power systems may also be usable.

The general layout of boat carriage 36 is shown in FIG. 3. Boat carriage 36 includes two side members 52 which each have parallel portions toward the rear of the carriage and converging portions toward the front of the carriage. The converging portions converge to and are rigidly connected to a bow piece 54 which is positioned beneath the bow of a boat being supported on the carriage. The bow piece of the carriage mounts a winch stand 56 (see FIG. 2) which extends generally upward from the plane defined by side members 52 and bow piece 54. The winch stand assembly is adjustably secured by U-bolts 58 to bow piece 54 to allow adjustment of the winch stand relative to the particular needs of the boat being supported. U-bolts 58 extend over a winch stand base 60 and bow piece 54. A winch stand mast 62 is rigidly connected to base 60 and extends upwardly to mount a winch 64. The cable and hook of the winch hook to boat 66 in the typical fashion and are used to winch the boat into location on the inclined boat carriage during removal of the boat from a body of water.

The two boat carriage side members 52 are connected by two transverse struts 68 and 70. The forward and rearward first and second transverse struts 68 and 70, respectively, can be either straight or curved to better accommodate the particular needs of boats being used with the trailer. The transverse carriage struts preferably are constructed with end plates 72 mounted thereto for detachably mounting the struts to the side members. The end plates are advantageously provided with a plurality of holes 74 therein for allowing the struts to be adjustably mounted at a variety of heights relative to the side members 52. Bolts 76 extend through holes in the side members and holes 74 to secure the struts at the desired height.

The transverse struts of the boat carriage are also advantageously used to mount the boat carriage roller assemblies 78. As shown, trailer 10 includes four such roller assemblies with two mounted on each of the transverse struts with one at each side of each strut. Each roller assembly 78 is preferably constructed and mounted to rock back and forth to accommodate variations in a boat hull as it is being installed Side-to-side rocking capability of either the assembly as a whole or the paired sets of rollers is also advantageous. Such roller assemblies are commercially available.

The boat carriage is also provided with boat retaining means for holding the boat in an installed position On the boat carriage. The boat retaining means can take on various forms with one exemplary form being shown and described herein. As shown, the boat retaining means is a pair of transom engaging bracket assemblies 80 which are adapted to mount at the distal ends of the boat carriage side members 52. The bracket assemblies are advantageously constructed so that shafts 81 of the brackets are received within the tubular side members 52 and retained therein using pins 82 which extend through the side members and the shaft of the bracket. The shafts 81 are connected to transverse bars 86 which mount bumper rollers 84. During launching the looking pins 82 are withdrawn and the bracket assemblies are rotated about the longitudinal axes of the shafts 81 sufficiently far so that rollers 84 and their supporting transverse bars 86 are clear of the boat being launched. Other forms of transom brackets or other boat retaining means are clearly useful in trailers made according to this invention.

The structural and operative interrelationship between the frame and the boat carriage will now be described Reference should first be given to FIGS. 5A and 5B. FIG. 5A shows a preferred boat carriage extending mechanism used in trailer 10. The starboard longitudinal frame member 32 is shown connected with the forward axle assembly 18 and the associated forward starboard wheel 16. A swing arm or lifting link 88 is pivotally connected to the frame member and to the boat carriage side member 52. The pivotal connection between the swing arm link 88 and frame member is preferably accomplished using a mounting bracket 90 which is preferably constructed for detachable mounting using bolts 92. The starboard side swing arm link shown in FIGS. 5A and 5B has a corresponding port side swing arm link 88 which is similarly mounted to the port longitudinal member of the frame using a similar mounting bracket 90. The port and starboard swing arms are most preferably joined together into a structural unit by a transverse swing arm bar 94. Reinforcing braces 96 are preferably welded between the link bars 88 and the transverse bar 94 to provide a strong U-shaped swing arm assembly 98. The entire swing arm assembly is pivotally mounted to the frame using the mounting brackets 90 at each end of the transverse bar 94. The mounting brackets have cylindrical shaft stubs 91 which extend partway into the ends of the tubular transverse bar 94.

Each side of the U-shaped swing arm assembly 98 is also pivotally connected to the corresponding side members 52 of the boat carriage. This is most preferably done at or very near the distal ends of the swing arm bars 88, such as by using boat carriage swing connection brackets 100. The pivotal connection at each side of the U-shaped assembly is preferably accomplished using a pair of brackets herein termed the outer and inner boat carriage swing connection brackets 100a and 100b, respectively (see FIG. 4). Pivot bolts 102 extend through apertures in the outer brackets 100a, swing bars 88, and inner brackets 100b, and are secured in position such as with a cotter pin (not shown).

The swing arm assembly 98 or other carriage lifting means is preferably operated by a power operator, such as hydraulic ram 104 or other suitable means operatively moving the swing arm assembly or boat carriage. The swing arm operator is preferably an extendible and contractible mechanical member capable of developing the forces needed to raise and lower the boat carriage and any boat loaded thereon. Fluid powered rams are preferred but other forms of mechanical devices for providing the desired force and motion of the carriage are also clearly possible. In the preferred embodiment there is preferably two rams, one for each side of the boat carriage to provide increased reliability and balanced loading without developing large torsional forces. Hydraulic rams 104 are pivotally mounted to the frame at longitudinal member 32 using suitable brackets 105 and to swing arm bars 88. Pressurized hydraulic fluid is supplied to ram 104 via hydraulic lines 106 from the hydraulic pump described above (not shown in the drawings) which is preferably mounted in storage container 50. Other alternative means for applying the force needed to lift the boat carriage are also possible, such as by applying the force directly to the boat carriage and using the swing arm member to control the desired movement of the carriage as it is extended and contracted.

The length of the swing arms and the positions at which they are connected to both the frame and boat carriage determine the motion which is experienced by the boat carriage during the extension and contraction. FIG. 5B shows the boat carriage in the collapsed or contracted position. FIG. 5A shows the boat carriage in the extended position. The swing arm assembly is mounted to the frame and boat carriage in such a way as to cause the boat carriage to not only raise at the forward end but to also shift rearwardly. The swing arm assembly and its connections are preferably designed so that the rearward motion of the boat carriage and any installed boat, are sufficient to cause the weight distribution of the trailer to shift rearwardly by an amount which offsets the loading associated with placement of a vehicle on the vehicle support platforms. When constructed in such a manner the trailer automatically compensates between the single load mode of operation shown in FIG. 2 and the dual load mode of operation shown in FIG. 1 without the user being required to make any further adjustments. This preferably keeps the center of gravity at the desired position, such as in the region between the two axle assemblies 18. This automatic adjustment of the weight distribution of the boat carriage on the frame to maintain a desirable weight distribution of the trailer as a whole will necessarily have some limitations with respect to the relative weights and sizes of the boats and vehicles being carried.

In the preferred embodiment the overall length of the trailer is approximately 25 feet (7.6 meters) and the approximate length of the boat carriage is approximately 19 feet (5.8 meters). In such an embodiment the front axle is approximately 16 feet (4.9 meters) rearward of the hitch and the rear axle is approximately 19 feet (5.8 meters) rearward of the hitch. The front of the boat carriage is approximately 8 feet (2.4 meters) rearward of the hitch, extending approximately 2 feet (0.6 meter) over the end of the frame. The swing arm is pivotally connected to the frame at a point approximately 15 feet rearward of the hitch and is sufficiently sized to swing an arc having a radius of approximately 3 feet (1 meter). This arrangement causes the boat carriage to shift rearwardly approximately 3 feet (1 meter) to counteract the weight associated with loading of the vehicle 26.

The rearward mounting system for the boat carriage must accommodate the longitudinal shifting of the boat carriage associated with movement between the contracted and extended positions FIGS. 7A, 7B, and 8 show a preferred structure according to this invention for accomplishing the desired structural support while accommodating the relative motion between the frame and boat carriage. The rearward boat carriage mounts 108 advantageously utilize the longitudinal frame members 32 to slidably support slide blocks 110. Slide blocks 110 are advantageously mounted to the boat carriage side members 52 at their connection with the rearward transverse boat carriage strut 70 using strut mounting bolts 76. This is advantageously accomplished using slide block housing pieces 112 which support and mount anti-friction slide block bearing pieces 114 which bear directly on the upper flat surfaces of the channel-shaped longitudinal frame members 32. The slide block assemblies 110 also include a vertical retainer 116 in the form of a lip piece which extends to engage a downwardly facing surface of the longitudinal frame member and prevent substantial upward motion of the boat carriage relative to the frame, such as might otherwise be caused when the trailer goes over bumps The operation of trailer 10 will now be described to provide an indication of the operation of this and other trailers constructed according to this invention. Trailer 10 is connected to a pulling vehicle (not shown) in the typical manner using hitch 22 and, if necessary, tongue jack 24. Once hitched trailer 10 can be backed into a body of water in the typical manner. A boat, such as boat 66, can then be installed on the trailer with the boat carriage in either the extended or collapsed positions. If installation is to be accomplished in the extended position then the hydraulic ram 104 is contracted to raise the boat carriage using the hydraulic pump motor control switch (not shown). If installation is to be accomplished in the collapsed position then the hydraulic ram is extended to lower the boat carriage. Installation with the boat carriage in the extended position will typically involve using the power winch 64 to pull the boat up the inclined boat carriage. Once the boat is properly positioned in the boat carriage then the boat retaining means, such as transom brackets 80, are rotated into their upright retaining positions to hold the boat on the carriage. The trailer and installed boat can then be driven in a single load mode of operation, preferably with the boat and boat carriage moved into the collapsed position.

If a vehicle is also to be hauled, then the trailer is either previously loaded with the vehicle prior to boat installation, or the vehicle can be installed after the boat has been installed. In either case the boat carriage is moved upwardly into the extended position before the vehicle is installed. The trailer tongue is then disconnected from any pulling vehicle and lowered to contact the ground. The detachable vehicle loading ramps or gangways 46 are installed as indicated in FIG. 1 to create temporary ramps for each side of the wheeled vehicle. The vehicle, such as vehicle 26 is then driven up the ramps and into proper position on the vehicle support platforms 38. The vehicle is then preferably secured in position on the trailer using suitable chains or other tie-downs (not shown) which are connected to the trailer frame and the vehicle.

When trailer 10 is used in the dual load mode of operation it has the advantage of being able to launch the installed boat without prior removal of the vehicle. Launching of the boat is done in the typical manner by first releasing the boat restraints 80 and then backing the trailer and installed boat rearwardly into a body of water. The boat is then slowly removed from the boat carriage with either the winch connected or disconnected as the steepness of the terrain and inclined position of the boat carriage dictate. A boat can be launched from the trailer when used in the single load mode of operation in substantially the same way In some situations the boat can be launched without raising the boat carriage and in others the boat will more easily be launched by raising the carriage into the extended position.

Trailer 10 and other trailers according to this invention can advantageously be constructed using a relatively light weight material such as a structural grade of aluminum to keep the total trailer weight low and to minimize pulling requirements. Other materials are also clearly possible. Whatever materials are used they can be assembled into the components shown and described herein using conventional metalworking and other manufacturing techniques.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A convertible dual load trailer capable of simultaneously carrying a boat and wheeled vehicle in a dual load mode of operation wherein the wheeled vehicle is carried in a forward position and a boat is carried in a rearward inclined position with portions of the boat extending upwardly and over portions of the wheeled vehicle, and capable of converting to a single load mode of operation wherein a boat is carried in a lowered collapsed position without a wheeled vehicle on the trailer, comprising:

frame means;

at least one wheel means for rollably supporting the frame means upon a road surface;

hitch means connected to the frame means for connecting the trailer to a pulling vehicle;

at least one vehicle support means connected to said frame means for supporting a wheeled vehicle thereon in a traveling position above the road surface;

at least one boat carriage adjustably and movably connected to the frame means;

at least one rearward boat carriage mounting for connecting rearward portions of the boat carriage to rearward portions of the frame means; said rearward boat carriage mounting permits pivotal and translational movement between the boat carriage and the frame means to thereby allow the boat carriage to move rearwardly as the boat carriage is extended upwardly into an extended position and to move forwardly as the boat carriage is retracted downwardly into a collapsed position;

an operator for moving the boat carriage between the extended and collapsed positions;

a boat carriage weight redistribution mechanism connected between the frame means and the boat carriage; said weight redistribution mechanism including at least one connection linkage which forces the boat carriage rearwardly as the boat carriage is extended upwardly, and which forces the boat carriage forwardly as the boat carriage is retracted downwardly, to thereby shift the center of gravity of the boat carriage and any boat supported thereon to compensate for changes in loading associated with removal and installation of a wheeled vehicle onto the vehicle support means;

whereby the boat carriage can be converted between the collapsed position wherein the boat carriage is collapsed downwardly toward the frame means, and the extended position wherein the boat carriage is inclined relative to the frame with rearward portions of the boat carriage positioned lower than front portions of the boat carriage to support rear portions of a boat, and said front portions of the boat carriage positioned relatively higher to support bow portions of a boat above any wheeled vehicle resting on said vehicle support means.

2. A trailer according to claim 1 wherein the boat carriage weight redistribution mechanism connection linkage includes at least one swing arm member which is pivotally connected to the frame at a rearward pivot and pivotally connected to the boat carriage at a forward pivot which is forward of said rearward pivot so as to move the boat carriage and any boat supported thereon rearwardly relative to said frame as the boat carriage is converted between the collapsed position and the extended position.

3. A trailer according to claim 2 wherein the operator is connected between the frame and the connection linkage.

4. A trailer according to claim 1 wherein;

said boat carriage weight redistribution mechanism includes a U-shaped swing arm assembly having at least two swing arm links which are spaced apart and positioned along opposite sides of the trailer; said swing arm links pivotally connected to the frame at a rearward pivot and pivotally connected to the boat carriage at a forward pivot which is forward of said rearward pivot so as to move the boat carriage and any boat supported thereon rearwardly relative to said frame as the boat carriage is converted between the collapsed position and the extended position; and said operator is a power operated unit which controllably moves the boat carriage between the collapsed and extended positions.

5. A trailer according to claim 1 wherein:

said boat carriage weight redistribution mechanism includes a U-shaped swing arm assembly having two swing arm links which are spaced apart and along opposite sides of the trailer; said swing arm links pivotally connected to the frame at rearward pivots and pivotally connected to the boat carriage at forward pivots which are forward of said forward pivot so as to move the boat carriage and any boat supported thereon rearwardly relative to said frame as the boat carriage is converted between the collapsed position and the extended position; and said at least one rearward boat carriage mounting includes at least two slide blocks positioned on opposite sides of the boat carriage which slide upon the frame means; said slide blocks being pivotally connected to the boat carriage; and said operator includes a fluid power operated unit which controllable moves the boat carriage between the collapsed and extended positions.

6. A trailer according to claim 1 wherein said at least one rearward boat carriage mounting includes slide blocks on opposite sides of the boat carriage which slide upon the frame means; said slide blocks being pivotally connected to the boat carriage.

* * * * *